United States Patent
Scheibe

(10) Patent No.: US 8,775,420 B2
(45) Date of Patent: Jul. 8, 2014

(54) TEXT DISPLAY OF GEO-REFERENCED INFORMATION BASED ON RELATIVE DISTANCE TO A USER LOCATION

(75) Inventor: Bernd Scheibe, Hamburg (DE)

(73) Assignee: Yahoo! Inc., Sunnyvale, CA (US)

( * ) Notice: Subject to any disclaimer, the term of this patent is extended or adjusted under 35 U.S.C. 154(b) by 1379 days.

(21) Appl. No.: 11/931,332

(22) Filed: Oct. 31, 2007

(65) Prior Publication Data

US 2009/0111487 A1  Apr. 30, 2009

(51) Int. Cl.
*G06F 17/30* (2006.01)
*H04Q 7/20* (2006.01)

(52) U.S. Cl.
USPC .................................... 707/724; 455/456.6

(58) Field of Classification Search
CPC ............... G06F 17/30905; G06F 17/30749; G06F 17/30867; G06F 17/3087; G06F 17/30761; G06F 17/30864; G06F 17/30241; G06F 17/30958; G06F 17/30554; G06F 17/30787; G06F 17/30817; G06F 17/30828; G06F 17/03

See application file for complete search history.

(56) References Cited

U.S. PATENT DOCUMENTS

| | | | | |
|---|---|---|---|---|
| 7,474,960 | B1 * | 1/2009 | Nesbitt ......................... | 701/533 |
| 7,620,494 | B1 * | 11/2009 | Matthews et al. ............. | 701/440 |
| 2005/0216362 | A1 * | 9/2005 | Navar et al. .................... | 705/26 |
| 2006/0242178 | A1 | 10/2006 | Butterfield et al. | |
| 2007/0143345 | A1 | 6/2007 | Jones et al. | |
| 2007/0271297 | A1 | 11/2007 | Jaffe et al. | |
| 2008/0070593 | A1 * | 3/2008 | Altman et al. ................. | 455/457 |
| 2009/0024315 | A1 * | 1/2009 | Scheibe ......................... | 701/208 |

OTHER PUBLICATIONS

Arampatzis, A. et al. (Jul. 2006). "Web-Based Delineation of Imprecise Regions," *Computers, Environment and Urban Systems* 30(4):436-459.

Jaffe, A. et al. (2006). "Generating Summaries and Visualization for Large Collections of Geo-Referenced Photographs," *Proceedings of the 8th ACM International Workshop on Multimedia Information Retrieval*, Santa Barbara, CA, 2006, pp. 89-98.

Larson, R.R. (1996). "Geographic Information Retrieval and Spatial Browsing," in *Geographic Information Systems and Libraries: Patrons, Maps, and Spatial Information*, Smith, L.C. ed. et al., Graduate School of Library Information Science University of Illinois at Urbana-Champaign: Urbana-Champaign, IL, pp. 81-124.

(Continued)

*Primary Examiner* — Shyue Jiunn Hwa
(74) *Attorney, Agent, or Firm* — James J. DeCarlo; Greenberg Traurig, LLP

(57) ABSTRACT

A system, method, and computer readable medium are provided for displaying geographically referenced information. In one example, a method includes causing a display of search results from a search of geographically referenced information (e.g., point-of-interest locations, geo-tagged objects, other users, and so on), the display comprising text associated with each of the search results, where the text varies for at least one of the search results based on the distance of the search results from a user location. For example, text associated with relatively close search results displayed more prominently than relatively distant search results. The method may further include generating presentation data according to a display scheme for displaying search results and communicating the presentation data to a user device. The method may vary the text based on at least one of font size, font style, color, shading, three-dimensional height, associated features, animation, combinations thereof, and the like.

21 Claims, 6 Drawing Sheets

(56) References Cited

OTHER PUBLICATIONS

MOBILOCO GMBH (2002-2005). "MOBILOCO-Buddy Alert," located at <http://www.mobiloco.de/subpages/buddy/0100.php>, last visited May 27, 2008, two pages.

MOBILOCO GMBH (2002-2005). "MOBILOCO-Buddy Alert," located at <http://www.mobiloco.de/subpages/buddy/0100.php>, last visited May 27, 2008, two pages. (English Translation, two pages).

MOBILICO GMBH (2002-2005). "MOBILICO-Location Based Services for Mobile Communities," located at <http://www.mobiloco.de>, last visited on May 27, 2008, two pages.

MOBILICO GMBH (2002-2005). "MOBILICO-Location Based Services for Mobile Communities," located at <http://www.mobiloco.de>, last visited on May 27, 2008, two pages. (English Translation, one page).

Purves, R. et al. (2005). "Identifying Imprecise Regions for Geographic Information Retrieval Using the Web," *Proceedings of GIS Research UK 13th Annual Conference*, 2005, Glasgow, UK, pp. 313-318.

Slawski, B. (2005-2007). "SEO by the SEA: Internet Marketing and Search Engine Optimization (SEO) Research, Consulting, and Services," located at <http://www.seobythesea.com/?p=708>, last visited on Jul. 11, 2007, six pages.

U.S. Appl. No. 11/593,869, filed Nov. 6, 2006, by Naaman et al.

U.S. Appl. No. 11/639,563, filed Dec. 15, 2006, by Naaman et al.

U.S. Appl. No. 11/872,494, filed Oct. 15, 2007, by Scheibe.

\* cited by examiner

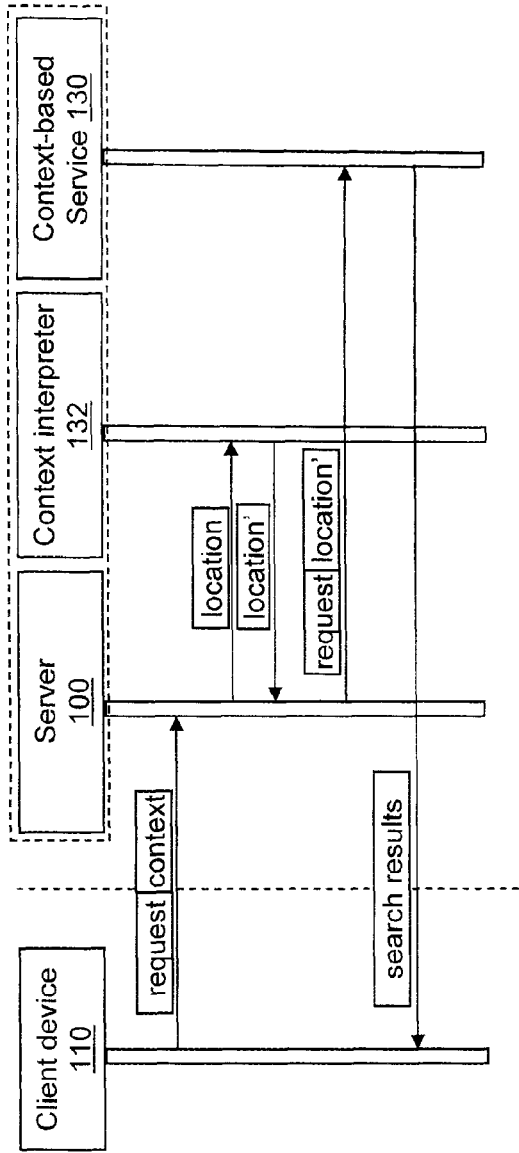
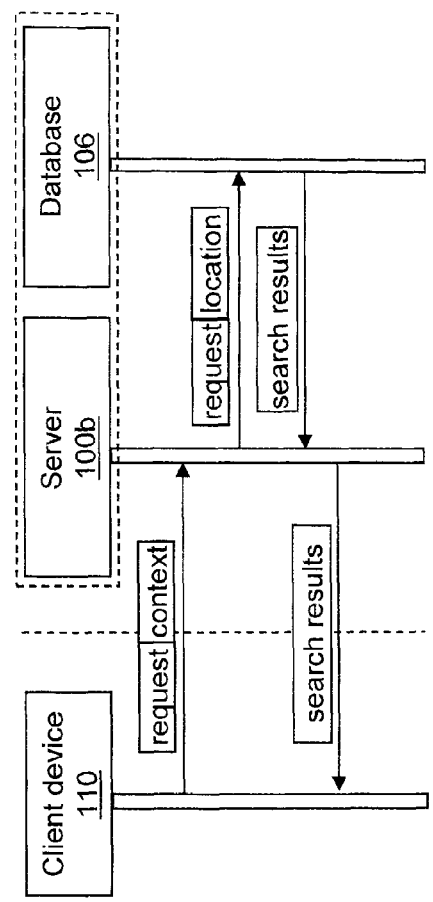
Figure 2A
Figure 2B

TEXT DISPLAY OF GEO-REFERENCED INFORMATION BASED ON RELATIVE DISTANCE TO A USER LOCATION

BACKGROUND

1. Field

The present invention relates generally to location based applications and services based upon the context of a user or user device, and in one example, to displaying search results according to the relative distance between a user and the location of the search results.

2. Related Art

Mobile devices, such as mobile phones, are becoming ever more prevalent and increasingly capable of determining the context of the environment in which they are used. For example, location services and applications may be used to supply information or services to a user's mobile device based on determined location information of the mobile device, e.g., via GSM network cell ID, Enhanced Observed Time Different (EOTD)-based location, Global Position System (GPS), and other location technologies. For instance, a location based application may display a map of a mobile device's determined location and provide an indication of one or more point-of-interest locations (such as a business, a tourist attraction, a person, e.g., a member of a user's social network, or the like) within a given geographical region.

Location services and applications employ a variety of techniques to represent points of interest in map interfaces. For example, locations are often represented using various types of icon graphics overlaid on a map which may be accompanied by text representing the type or even the name of the corresponding location. Alternatively, locations may be represented in a list ordered by their respective distance from a particular location. Unfortunately, such conventional representations have inherent limitations depending, for example, on the scope of the geographic area represented (e.g., the map magnification or zoom level), or the size of the display on which the information is presented.

For example, if a user of a mobile device wants to see all of the Italian restaurants in New York City, conventional techniques are generally inadequate for representing the hundreds (if not thousands) of locations in the five boroughs, particularly on the relatively small display of a typical mobile device. Either the icons presented would obscure the map on which they are overlaid, or the list of locations would be far too long to scroll through.

BRIEF SUMMARY

According to one aspect of the present invention a computer implemented method for displaying location based items relative to a user's geographical location is provided. In one example, the method includes causing a display of search results from a search of geographically referenced information (e.g., point-of-interest locations, geo-tagged objects, other users, and so on), wherein the display comprises text associated with each of the search results and the text varies for at least one of the search results based on the distance of the search results from a user location. For example, text associated with relatively close search results displayed more prominently than relatively distant search results.

The method may include generating presentation data according to a display scheme for displaying search results according to relative distances to a user location and communicating the presentation data to a user device. The method may vary the text based on at least one characteristic such as font size, font style, color, shading, three-dimensional height, associated features, animation, combinations thereof, and the like.

In another example, a method includes causing a communication of presentation data to a user device for the display of search results from a search of geographically referenced information, the presentation data operable to vary the text of at least one of the search results based on the distance of the search results from a user location. The presentation data may operate according to various display schemes for displaying the search results based on relative distances to a user location.

The various aspects and examples of the present invention are better understood upon consideration of the detailed description below in conjunction with the accompanying drawings and claims.

BRIEF DESCRIPTION OF THE DRAWINGS

FIGS. 2A and 2B illustrate exemplary information flows between a server and a user device according to one example;

DETAILED DESCRIPTION

Figure 1:
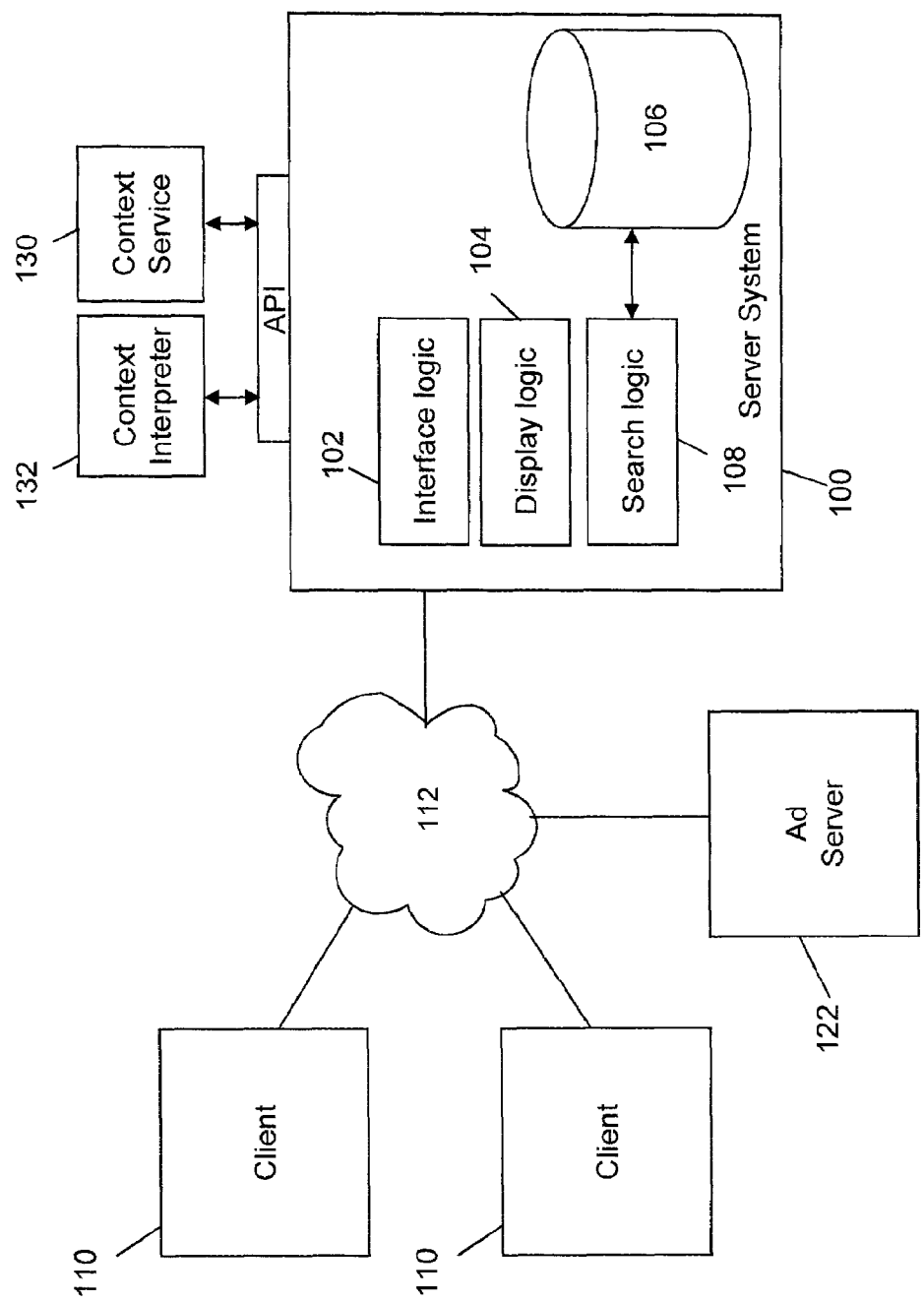
FIG. 1 illustrates an exemplary client-server architecture and environment in which some aspects and examples described may by used.

The following description is presented to enable a person of ordinary skill in the art to make and use the various aspects and examples of the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Mobile devices generally have limited real estate on a display screen for displaying information relative to desktop computers. Further, users of mobile devices often desire information to be presented in a manner that may be quickly interpreted. For example, within location related applications it is often desirable to indicate the relative distance between a user's location and surrounding geographically referenced information, e.g., point-of-interest (POI) locations or the location of other users. A typical approach includes displaying a map with geographically referenced information overlaid (or included) within the display of the map or displaying a list view of the locations and distance thereto. Both of these representations typically use a lot of real estate on the screen and/or demand more attention and time from a user to investigate and understand.

It is known to use tag clouds for presenting keywords or tags that have been used more frequently than others and to express what is more relevant, for example, displaying tags of varying size overlaid on a map based on various metrics, including popularity or frequency of use. Exemplary systems and methods are described, e.g., in co-pending U.S. patent application Ser. No. 11/437,344, entitled "SUMMARIZATION OF MEDIA OBJECT COLLECTIONS," and filed May 19, 2006, and Ser. No. 11/639,563, entitled "VISUALIZING LOCATION-BASED DATASETS USING 'TAG MAPS'", and filed on Dec. 15, 2006, both of which are hereby incorporated by reference in their entirety as if fully set forth herein. Although in some examples the display of tags is dependent on the zoom level or search criteria, the exemplary system and methods do not size or display the tags more prominently based on relative geographic distances from a user, i.e., the displayed tags in the aforementioned applications are not sensitive to the user's position.

In one example provided herein, an exemplary method includes displaying geographically referenced information according to a presentation scheme where geographically referenced information (e.g., search results, types of location based information, and the like) that are geographically closer to the location of the user are displayed more prominently (or at least differently) than other geographically reference information. For example, search results are displayed as text where those that are geographically close to the user are displayed in larger or bolder font, thereby providing a quick and clear indication of a nearby search result. In one example, the method includes receiving or determining a location associated with the user and a search request from the user, causing a search of geographically referenced information based on the search request, determining relative distances between the user and the search results, and generating presentation data or causing the display of the search results according to the relative distances.

The search may be of various types of geographically referenced information, including but not limited to point-of-interest locations, geo-tagged information (e.g., media objects, comments, geo-caches, etc.), or persons (e.g., friends, contacts, social network members, etc.). In one example, the top few search results may be displayed as a text and ordered according to input search criteria, where search results that are relatively close to the user's location are shown more prominently, e.g., in larger or bolder fonts, while search results that are further away are shown less prominently, e.g., in smaller or normal font. In this manner a user may quickly and easily gather which of the search results are relatively nearby.

It is noted that as used herein, the term "point-of-interest" (or "POI") refers to any fixed or dynamic location which may be described as a geographical location or depicted in a map interface, and may correspond, for example and without limitation, to a business establishment, a tourist attraction, a landmark, a person or other entity, user-generated content (e.g., comments or reviews of particular location or establishment, etc.), user associated location (e.g., private locations/events), public events, a geocache, coupons, local promotions, etc.

Initially, and with reference to FIG. 1, an exemplary environment is described in which some examples of the exemplary systems and methods for displaying geographically referenced information may be used. In particular, FIG. 1 illustrates a client-server system in which one or more client devices 110 may communicate with a server system 100 via network 112. Server system 100, which may include one or more server devices, generally includes interface logic 102 for interfacing with network 112, display logic 104 for causing the display of search results based on relative distance information from the user location, and search logic 108 for searching and associating information or services to one or more client devices 110 based, at least in part, on received context information (e.g., including location information, time, date, etc.) from one or more client devices 110. Server system 100 may further include a database 106 for storing information including, for example, POI location information, map information, context information, and information or services for associating with data based on received context and request criteria information. As will be described, database 106 may be stored locally with server system 100 or remotely to server system 100.

Context information may include one or more of location information, time, ambient conditions, device or user ID, device type, user profile information, Personal Management Information (PIM), and the like. In one example, client device 110 may generate geographical location information (e.g., from a GPS location device, cell identification, or other location technologies), which is communicated to server system 100 with a request for location information, e.g., with a search request and search criteria. The context information may be communicated to server system 100 by client device 110 or from another device. For example, a cell ID might be determined by a wireless server and transmitted to server system 100 for determining the location information, where the context is not generated directly by the user device (nor is the context information communicated from the client device 110). Additionally or alternatively, a user may manually enter geographical location; for example, in instances where the device is not capable of generating location information or the user wishes to input a geographical location different than their current location.

Client devices 110 and server system 100 may include suitable communication interfaces to communicate in part or in whole via network 112. Network 112 may include a Wide Area Network (WAN) such as the Internet, a wireless network, such as a wireless gateway, e.g., a cellular, satellite, or other wireless network, a non-wireless network such as a cable or fiber optic network, or a combination of wireless and non-wireless systems. Client devices 110 and server system 100 may communicate, in part or in whole, via wireless or hardwired communications, such as Ethernet, IEEE 802.11b wireless, or the like. Additionally, communication between client devices 110 and server system 100 may include (or access) various servers such as a map server, mobile server, media server, mail server, and the like. Client devices 110 for use with server system 100 may include a typical web browser application, a wireless application protocol (WAP) feature, or other data communication protocol associated with the device of client devices 110 suitable to communicate with server system 100.

In this example, server system 100 includes interface logic 102 for receiving context information (including location information), request criteria, user-input, and the like. To that end, server system 100 may utilize various wireless or Web data interface techniques such as Common Gateway Interface (CGI) protocol and associated applications (or "scripts"), Java® "servlets", i.e., Java® applications running on a wireless server, Web server, or the like to present information and receive input from client devices 110. It will be appreciated that server system 100, although described herein in the singular, may actually comprise plural computers, devices, backends, and the like, communicating (wired and/or wireless) and cooperating to perform some or all of the functions described herein. Additionally, server system 100 may be implemented in various fashions and include various hardware, software, or firmware to carry out the examples described herein.

Display logic 104 generally operates to provide presentation data for search results and/or cause the display of search results according to the relative distances between the user and locations associated with the search results. As described herein, display logic 104 may operate to generate data for displaying relatively close search results more prominently than relatively distant search results. Display logic 104 may include various display and/or presentation data algorithms for carrying out the functions described and may be implemented via a processor programmed for executing the algorithm(s), or a state machine or other dedicated logic for executing the algorithm(s). Display logic 104 may apply a display scheme to the search results and generate presentation data information for each search results in accordance with the relative distance from the user location. For example, a search result including the text "sushi bar," may have presentation data associated therewith by display logic 104 for displaying the text according to the relative distance to the user's location, e.g., displaying the text at the largest font of the display scheme if the search result is the geographically closest search result. In other examples, display logic 104 may display text according to a predetermined distance to the user's location, e.g., displaying text at the largest font of the display scheme if the search result is within 100 meters.

In some examples, all presentation data will follow the same scheme, but any number of schemes may be employed, including, but not limited to, size (e.g., with closer locations displayed larger), color (e.g., with closer locations displayed with brighter colors such as red), shadings (e.g. with closer location displayed darker), three-dimensional (e.g., with closer locations displayed taller), blinking or animation (e.g., with closer locations displayed blinking faster, fading in and out faster, moving or wiggling faster, etc.), and the like. In addition to these exemplary display schemes, the text may be supplemented by or replaced with symbols, icons, links to web sites or web pages, graphics, thumbnail pictures, and the like, and these items may also vary in size, color, or shading, and may blink, fade in and out, pop-up, and the like. The display algorithm may have a fixed display scheme for all search results or may have different schemes for different search types or categories, or alternatively the display schemes may be user-selectable, based on device capabilities, and so on.

The display scheme may then be applied to the search results for display. For example, if a scheme using three font sizes is used, then the three closest search results may be assigned to the appropriate font sizes, with the remaining search results (e.g., four through n) displayed at a standard or relatively small font size. In other examples, some presentation data may be assigned the same appearance information (e.g., assigned the same font size) to indicate similar distances from the user location.

Search logic 108 generally operates to search (or at least cause the search of) and associate information (e.g., POI location information, maps, advertisements, directions, and so on) with information received from or associated with a client device 110. For example, information may be searched locally, e.g., within database 106, and/or remotely, e.g., with a context-based service 130 as described below, based on received context information and user request criteria. Search logic 108 may further be operable to order and/or filter search results based on received search criteria, relative location of the user with search results (e.g., POI locations, other users, and so on).

Server system 100 may thereafter transfer (or initiate/direct the transfer of, e.g., via advertisement server 122) information to one or more client devices 110 (which may or may not include the particular client device 110 associated with the information received by server system 100). Additionally, server system 100 may include various other components known in the art, e.g., a scripting engine (such as a PHP scripting engine, which may include authentication logic, upload logic, metadata processing logic, permissions handling logic, and so on).

Alternatively or in addition to search logic 108 causing a search of local database 106, a portion or all of the received context information, request criteria, and so on may be communicated to a remote or third party service provider or server system, e.g., a map and/or search server system, mobile phone service provider, advertisement server, and so on, which may in turn communicate associated information with one or more client devices 110 or provide one or more client devices 110 access to such information. For example, server system 100 may communicate information to one or more of a context interpreter 132 and context-based service 130, e.g., via one or more Application Program Interfaces (API), as shown. In one such example, server system 100 may communicate context information to a context interpreter 132; for example, communicating raw location information such as mobile cell ID, GPS information, or wireless access point location, and queries context interpreter 132 for city and street information. Additionally, received context information may include and relate to the date, time of day, ambient conditions, information related to a Personal Management Information (PIM) application or service, or combinations thereof, which may be determined or modified by context interpreter 130. The information processed by context interpreter 130 is in turn communicated to server system 100, and may be communicated to a context-based service 130.

Context-based service 132 may include various servers and services, e.g., a search server (e.g., for searching POI information), map server, or the like, operable to service search requests by client devices 110. For example, the location information a user device and/or an input location, search criteria, and so on may be communicated to context-based service 132 including a search server for searching geographical POI locations, other users, etc., and ordering the search results based on the search criteria. It is noted that in other examples, client device 110 may be capable of providing more complete context information, which does not require the use of a context interpreter 130, or alternatively, context-based service 132 may include or access a context interpreter directly.

FIG. 1 further illustrates an advertisement server 122, which may communicate through network 112 with one or more client devices 110 and/or to server system 100. Advertisement server 122 may operate to associate advertisements with received context information and/or user-generated search requests for transmission to a client device 110. For example, an advertisement may be associated with a response to client device 110 based on a user's context/location information, an inputted search request, search results, the city or area being searched, and the like. In one example, advertisement server 110 communicates with server system 100 and transmits advertisement data thereto, for example, in response to input from client device 110. Server system 100 may transmit the advertisement data with a response or display to client device 110. In other examples, advertisement server 110 may send the advertisement data directly to client device 110 based on information from server system 100 and/or client device 110. It will be appreciated that server system 100 and advertisement server 122 are illustrated as separate items for illustrative purposes only; in other examples, they may be included in a common server device or system (e.g., backend or service provider).

FIGS. 2A and 2B illustrate and contrast exemplary flows of information between exemplary servers 100, 100b and client device 110 according to two examples. In particular, FIG. 2A illustrates the flow of data between server system 100, context interpreter 132, and context-based service 130, all of which may be included as separate server systems or within a common associated server system, e.g., a common backend.

The flow of information is generally as described with respect to FIG. 1; for example, location information as well as any other context information and search criteria are received by server system 100. In one example, the location information may be interpreted by interpreter 132 and the interpreted location communicated to the context based service 130. Context-based service 130 may include a search server for searching geographical information such as POI locations based on the received location information of the user. The listing of search results and associated location or relative distance information may be transferred to server system 100 and thereafter transferred or accessible to one or more users or user devices including, for example, client device 110. Additionally, context-based service 132 may communicate search results and/or presentation data directly to client device 110 or a different device.

In contrast, FIG. 2B illustrates the flow of data between client device 110 and server system 100b, where server system 100b includes logic to carry out functions similar or identical to context interpreter 132, and context-based service 130 of FIG. 2A (or operates without such functions). Server system 100b may include interface logic for receiving data and context and search logic for searching geographically referenced information (such as POI locations and so on from database 106). In both examples, server system 100 and 100b may include interface logic for receiving or determining location information from a user, causing a search of geographical location information based on the user location, causing a generation of presentation data based on the relative location of the user with the search results, and causing a plurality of the search results to be communicated to client device 110 for display based on their relative locations to the user location.

FIGS. 3A-3D illustrate exemplary displays for displaying search results as described herein. It is noted that a search request may be made via a client device accessing a dedicated webpage or application, as a feature included with a communication application such as with an Instant Message (IM) or chat application interface (e.g., as a button), text messaging or Short Service Messaging (SMS) application, social communication applications, and the like. In other examples, a search request may be made via email, Short Message Service (SMS), or the like, and a response communicated to a user device in a similar or dissimilar fashion as the request.

Figure 3A:
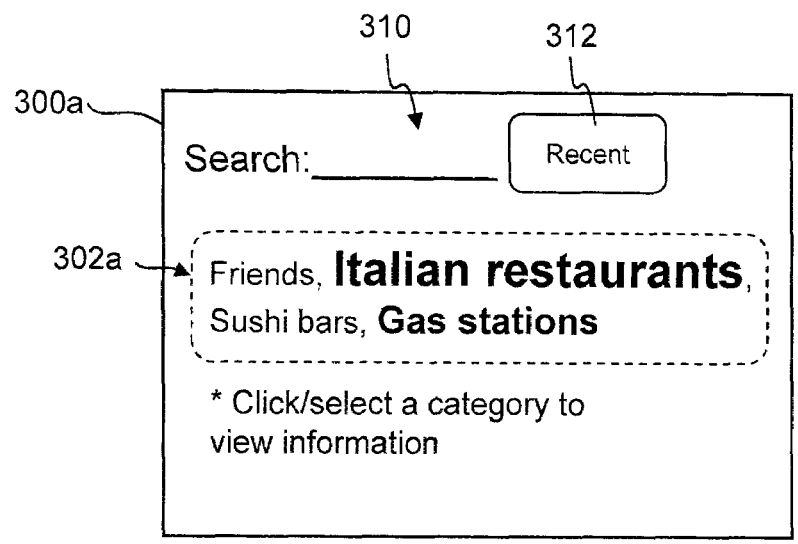
FIGS. 3A to 3D illustrate exemplary displays of search results for a user device according to one example.

FIG. 3A illustrates an exemplary display 300a which includes a search criteria field 310 for entering one or more search terms and displaying results therebelow. Further, display 300a includes a recent selection 312, which when selected displays recent types or categories of geographically referenced information as shown by search results 302a. For example, recent selection 312 may cause the display of the last five types or categories of searches performed by the user. In some examples, recent selection 312 may alternatively or additionally cause the display of types of content other users have recently viewed, (e.g., all other users, users having similar locations or context information, user in the same or similar social groups, and so on).

The search results or items may include types of geographically referenced information (e.g. friends, Italian restaurants, Sushi bars, and the like) for which the user has searched or viewed recently. The location types or terms are represented differently in size and/or style as shown depending on the distance to the users chosen location. In this example, the search results are ordered based on the search algorithm and their display varied based on their relative distances from the user location (e.g., with closer items displayed more prominently). According, a user would quickly be apprised that an Italian restaurant is the closest search results to their current location based on the prominence of "Italian restaurant." Further, as indicated below search results 302a, a user may click on one of the displayed categories of geographically referenced information to view additionally information, for example, to view a listing of items within the category.

Figure 3B:
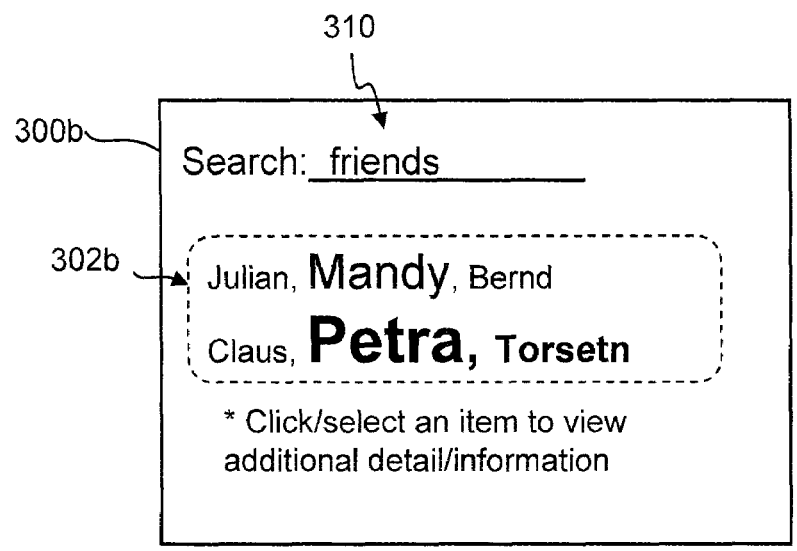

FIG. 3B illustrates an exemplary display 300b and search results 302b in response to the selection of "friends" via search results 302a of display 300a (FIG. 3A). In another example, a search may be performed within a type or category of geographically referenced information, e.g., a content type or search criteria may be input in search criteria field 310 as shown in display 300b. A user may further select an item or search result from search results 302b to access additional information regarding the item. For example, additional information might include the distance from the user's location, address information, directions to the location, a map displaying the search result(s), user recommendations or comments, ratings, and the like (of course, more or less information may be displayed or accessible).

Figure 3C:
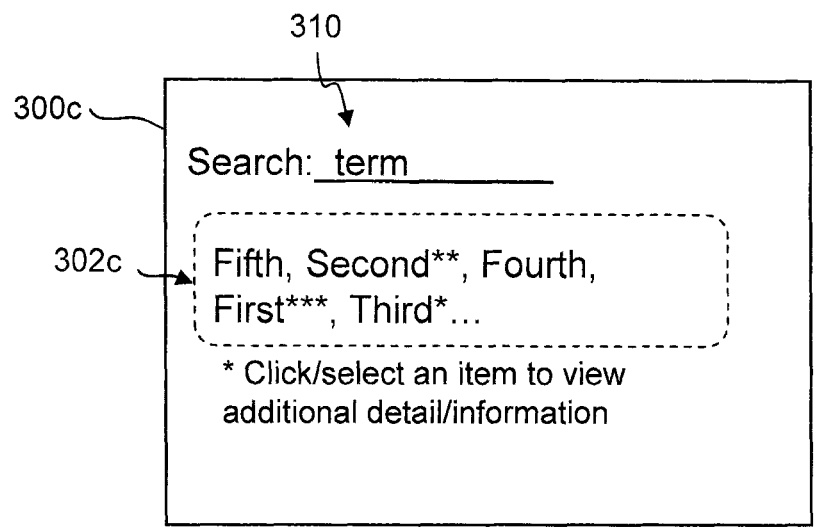
Figure 3D:
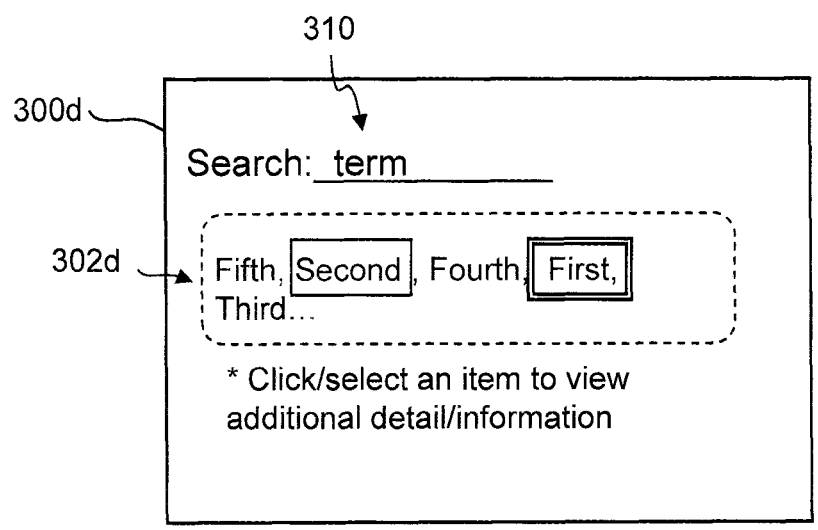

FIGS. 3C and 3D illustrate additional exemplary displays 300c and 300d for displaying search results. In particular, with reference to display 300c, search results 302c are displayed having similar size and style text, however, asterisks are used next to the first, second, and third closest search results to indicate relative distances. For example, a single asterisk next to the closest search result, two asterisks next to the next closest search result and so on, thereby visually indicating the relative distances of search results 302c. In other examples, stars, numbers, superscript numbers, or the like may be displayed to indicate relative distances. Further, display 300d includes a double box around the closest of the search results 302d for visually indicating the closest item.

In other examples, the color of the search results may be varied in a manner associated with relative distances from the user (and further, the color may vary in addition to varying the text size, font, etc., as described). For example, red may indicate the closest search result, yellow the next closest, blue the third closest, grey further away, and so on. Other color variations are possible and may be user selectable. Further, the color (or other display variation of the search results) may indicate a predetermined distance from a user location as opposed to merely a relative distance; for example, continuing with the example of color, "red" may indicate the search results is within 100 meters, "blue" may indicate the search result is between 100 and 1000 meters, and so on (whereas in another application "red" may indicated the search result is the closest, "blue" the second closest and so on).

It will be appreciated that the various described methods for displaying search items based on distance are illustrative only and not intended to be exhaustive. Further, various other manners for displaying search results are possible and may further depend on the capabilities of the user device. Further, other features such as maps, driving directions, user comments or reviews, links to websites, coupons, phone numbers, contact information of a business or other users, advertisements, and the like may be displayed with the search results or in response to a selection of one or more of the search results.

Figure 4:
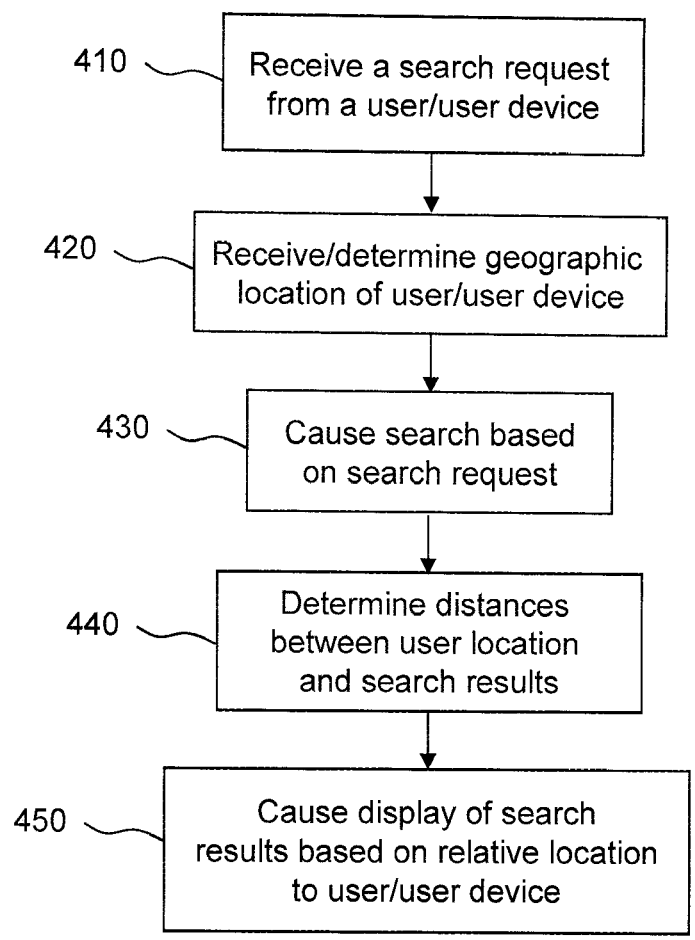
FIG. 4 illustrates an exemplary method for responding to a search request and presenting search results according to one example.

FIG. 4 illustrates an exemplary method for servicing a search request for geographically referenced information. The method includes receiving a search request at 410, which may include one or more search criteria. For example, the search criteria may include a request for a particular type or kind of POI location (such as a restaurant or park), user generated content (such as geo-tagged photos, comments, and so on), or other user's (such as friends of the user making the request, friend of friends, or users associated with social networks). Additionally, a user may search for types of content they or other users have recently viewed or accessed.

The method includes receiving or determining current location information for a user at 420. In one example, a server device may receive the identity of a user and location information. As described herein, the location information may be raw data, e.g., GPS coordinates or cell-ID, which may be translated or converted to a city and street address remotely or locally. Further, the location information may be received directly from the client device or from another device, e.g., from a mobile server.

The method further includes searching (or causing a search of) geographically referenced information (e.g., POI locations etc.) based on the search request at 430. As described, the search may be performed based on the search criteria to determine matches to the search request. The search may further be restricted to a geographical region that the user falls within, e.g., the search within the city, zip code, a predefined radius, or the like. Any suitable search algorithm may be used to search for geographically referenced information. Further, any suitable algorithm may be used to initially determine a location from which to initially restrict the search; for example, a radius may be taken around the user location and searched therein. It will be appreciated that alternative and additional algorithms and methods for searching and/or determining a default region to search around a user location can be used.

Additionally, the search results and/or the presentation of the search results may be influenced by other contextual information such as the time of day, day of the week, traffic conditions, weather conditions, and the like. For example, at certain times of the day, parts of a city may take longer to traverse due to traffic, certain POI locations such as a library or museum may be closed at certain times/days of the week, and so on.

The method further includes determining or calculating the distance between the user location and locations associated with the search results at 440. The distance may be determined in any suitable fashion. For example, the distance may be determined as an exact geographical distance (e.g., a direct line between the two locations), based on travel maps (e.g., the distance as traveled along streets between the two locations), based on travel time (e.g., the estimated travel time between the two locations), or the like.

The method further includes initiating or causing the display of a plurality of the search results based on the relative location to the user at 450. In one example, presentation data is generated for the search results, the presentation data for causing text associated with the search results that are geographically near the user location to be displayed more prominently than more distant search results. In another example, the search results and relative locations may be communicated to the user device which displays the search results according to a predefined display scheme based on the relative distance information. Further, various other information, such as maps, driving directions, advertisements, and so on may be communicated to the users in series or in parallel to the search results. For example, upon selection of a search results, a map or driving directions thereto, an associated website or contact information, and the like may be communicated to the user.

It will be appreciated that the method may be carried out in various orders and some of the recited features omitted. For example, the location and search criteria may be received in other orders or simultaneously. Further, the search request may also be based on the location of the user device and include information relevant for determining the relative distances to the user location. Various other modifications to the described method will be apparent to one of ordinary skill in the art.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 5:
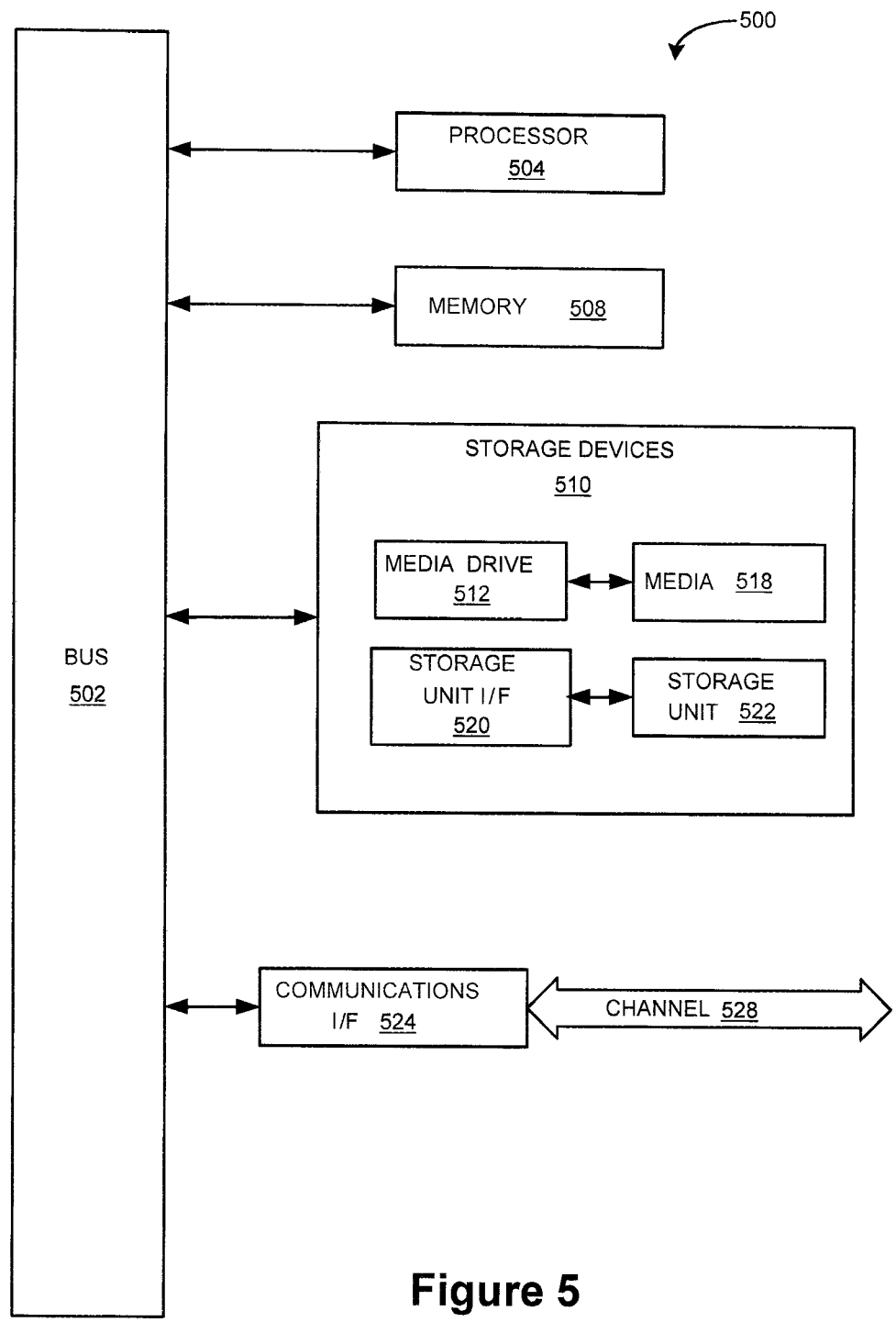
FIG. 5 illustrates an exemplary computing system that may be employed to implement processing functionality for various aspects of the invention.

FIG. 5 illustrates an exemplary computing system 500 that may be employed to implement processing functionality for various aspects of the invention (e.g., as a client device or a server device). Those skilled in the relevant art will also recognize how to implement the invention using other computer systems or architectures. Computing system 500 may represent, for example, a desktop, laptop or notebook computer, hand-held computing device (PDA, cell phone, smart phone, and the like), mainframe, server, client, or any other type of special or general purpose computing device as may be desirable or appropriate for a given application or environment. Computing system 500 can include one or more processors, such as a processor 504. Processor 504 can be implemented using a general or special purpose processing engine such as, for example, a microprocessor, microcontroller or other control logic. In this example, processor 504 is connected to a bus 502 or other communication medium.

Computing system 500 can also include a main memory 508, preferably random access memory (RAM) or other dynamic memory, for storing information and instructions to be executed by processor 504. Main memory 508 also may be used for storing temporary variables or other intermediate information during execution of instructions to be executed by processor 504. Computing system 500 may likewise include a read only memory ("ROM") or other static storage device coupled to bus 502 for storing static information and instructions for processor 504.

The computing system 500 may also include information storage mechanism 510, which may include, for example, a media drive 512 and a removable storage interface 520. The media drive 512 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 518 may include, for example, a hard disk, floppy disk, magnetic tape, optical disk, CD or DVD, or other fixed or removable medium that is read by and written to by media drive 514. As these examples illustrate, the storage media 518 may include a computer-readable storage medium having stored therein particular computer software or data.

In alternative embodiments, information storage mechanism 510 may include other similar instrumentalities for allowing computer programs or other instructions or data to be loaded into computing system 500. Such instrumentalities may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to computing system 500.

Computing system 500 can also include a communications interface 524. Communications interface 524 can be used to allow software and data to be transferred between computing system 500 and external devices. Examples of communications interface 524 can include a modem, a network interface (such as an Ethernet or other NIC card), a communications port (such as for example, a USB port), a PCMCIA slot and card, etc. Software and data transferred via communications interface 524 are in the form of signals which can be electronic, electromagnetic, optical, or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 508, storage device 518, storage unit 522, or signal(s) on channel 528. These and other forms of computer-readable media may be involved in providing one or more sequences of one or more instructions to processor 504 for execution. Such instructions, generally referred to as "computer program code" (which may be grouped in the form of computer programs or other groupings), when executed, enable the computing system 500 to perform features or functions of embodiments of the present invention.

In an embodiment where the elements are implemented using software, the software may be stored in a computer-readable medium and loaded into computing system 500 using, for example, removable storage drive 514, drive 512 or communications interface 524. The control logic (in this example, software instructions or computer program code), when executed by the processor 504, causes the processor 504 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method comprising:
receiving a search request by at least one server computer, the search request identifying search criteria;
cause, by the at least one server computer, a search of geographically referenced information using the search criteria to identify search results, the search results comprising a plurality of result items, each result item of the plurality having associated text for a display of the search results result items and having an associated location;
for each result item of the plurality, the at least one server computer determining a distance of the result item from a user's location using the user's location and the result item's associated location; and
causing, by the at least one server computer, the display of the search results, wherein the display of the search results comprises the text for each of the plurality of result items, and at least one appearance characteristic of the text varies for at least one result item of the search results based on the at least one result item's distance from the user's location, the result item's distance from the user's location is determined using the user's location and the at least one result item's associated location and one of the plurality of result items closest in distance to the user's location relative to other ones of the plurality of result items is displayed more prominently than the other ones of the plurality of result items, wherein the at least one appearance characteristic is selected from the group consisting of font size, font style, color, shading, three-dimensional height, associated features, and animation.

2. The method of claim 1, wherein causing the display of search results comprises causing communication of presentation data associated with the search results to a remote device.

3. The method of claim 1, wherein the geographically referenced information comprises point-of-interest locations.

4. The method of claim 1, wherein the geographically referenced information comprises other users.

5. The method of claim 1, wherein the geographically referenced information comprises geo-tagged information.

6. The method of claim 1, wherein the at least one appearance characteristic of the text of the at least one result item of the displayed search results varies based on the at least one result item's distance from the user's location relative to at least one other result item's distance from the user's location.

7. The method of claim 1, wherein the at least one appearance characteristic of the text of the at least one result item of the displayed search results varies based on a predetermined distance and the result item's distance from the user's location.

8. A method comprising:
receiving a search request by at least one server computer, the search request identifying search criteria;
performing, by the at least one server computer, a search of geographically referenced information using the search criteria to identify search results, the search results comprising a plurality of result items, each result item of the plurality having associated text for a display of the search results and having an associated location;
for each result item of the plurality, the at least one server computer determining a distance of the result item from a user's location using the user's location and the result item's associated location; and
causing a communication of presentation data to a user device for the display of the search results, the display of the search results comprises the text for each of the plurality of result items, the presentation data operable to vary at least one appearance characteristic of the text of at least one result item of the search results based on the at least one result item's distance from the user's location, the result item's distance from the user's location is determined using the user's location and the at least one result item's associated location and one of the plurality of result items closest in distance to the user's location relative to other ones of the plurality of result items is displayed more prominently than the other ones of the plurality of result items, wherein the at least one appearance characteristic is selected from the group consisting of font size, font style, color, shading, three-dimensional height, associated features, and animation.

9. The method of claim 8, further comprising causing a communication of the search results for display according to the presentation data.

10. The method of claim 8, wherein the geographically referenced information comprises point-of-interest locations.

11. The method of claim 8, wherein the presentation data is further operable to vary the at least one appearance characteristic of the text of the at least one result item of the search results based on the at least one result item's distance from the user's location relative to at least one other result item's distance from the user's location.

12. The method of claim 8, wherein the at least one appearance characteristic of the text of the at least one result item of the displayed search results varies based on a predetermined distance and the result item's distance from the user's location.

13. An apparatus comprising:
at least one server computer comprising at least one processor and memory, the memory storing and the at least one processor executing:
logic to receive a search request, the search request identifying search criteria;
logic to cause a search of geographically referenced information using the search criteria to identify search results, the search results comprising a plurality of result items, each result item of the plurality having associated text for a display of the search results and having an associated location;
logic to determine, for each result item of the plurality, a distance of the result item from a user's location using the user's location and the result item's associated location; and
logic to generate presentation data for the display of the search results, the display comprising the text for each of the plurality of result items, the presentation data operable to vary at least one appearance characteristic of the text of at least one result item of the search results based on the at least one result item's distance from the user's location, the result item's distance from the user's location is determined using the user's location and the at least one result item's associated location and one of the plurality of result items closest in distance to the user's location relative to other ones of the plurality of result items is displayed more prominently than the other ones of the plurality of result items, wherein the at least one appearance characteristic is selected from the group consisting of font size, font style, color, shading, three-dimensional height, associated features, and animation.

14. The apparatus of claim 13, wherein the geographically referenced information comprises point-of-interest locations.

15. The apparatus of claim 13, wherein the geographically referenced information comprises other users.

16. The apparatus of claim 13, wherein the display logic is operable to vary the text of the at least one result item of the displayed search results based on the at least one result item's distance from the user's location relative to at least one other result item/s distance from the user's location.

17. A computer-readable non-transitory storage medium encoded with computer program instructions executable by at least one server computer to:
receive a search request, the search request identifying search criteria;
cause a search of geographically referenced information using the search criteria to identify search results, the search results comprising a plurality of result items, each result item of the plurality having associated text for a display of the search results and having an associated location;
for each result item of the plurality, determine a distance of the result item from a user's location using the user's location and the result item's associated location; and
cause the display of the search results, wherein the display of the search results comprises the text for each of the plurality of result items, and at least one appearance characteristic of the text varies for at least one result item of the search results based on the at least one result item's distance from the user's location, the result item's distance from the user's location is determined using the user's location and the at least one result item's associated location and one of the plurality of result items closest in distance to the user's location relative to other ones of the plurality of result items is displayed more prominently than the other ones of the plurality of result items, wherein the at least one appearance characteristic is selected from the group consisting of font size, font style, color, shading, three-dimensional height, associated features, and animation.

18. The computer-readable non-transitory storage medium of claim 17, wherein the computer program instructions to cause the display of search results comprise computer program instructions to cause communication of the presentation data associated with the search results to a remote device.

19. The computer-readable non-transitory storage medium of claim 17, wherein the geographically referenced information comprises point-of-interest locations.

20. The computer-readable non-transitory storage medium of claim 17, wherein the geographically referenced information comprises other users.

21. The computer-readable non-transitory storage medium of claim 17, wherein the at least one appearance characteristic of the text of the at least one result item of the displayed search results varies based on the at least one result item's distance from the user's location relative to at least one other result item's distance from the user's location.

\* \* \* \* \*